S. D. MUSE.
Rakers and Loaders.
No. 155,664. Patented Oct. 6, 1874.
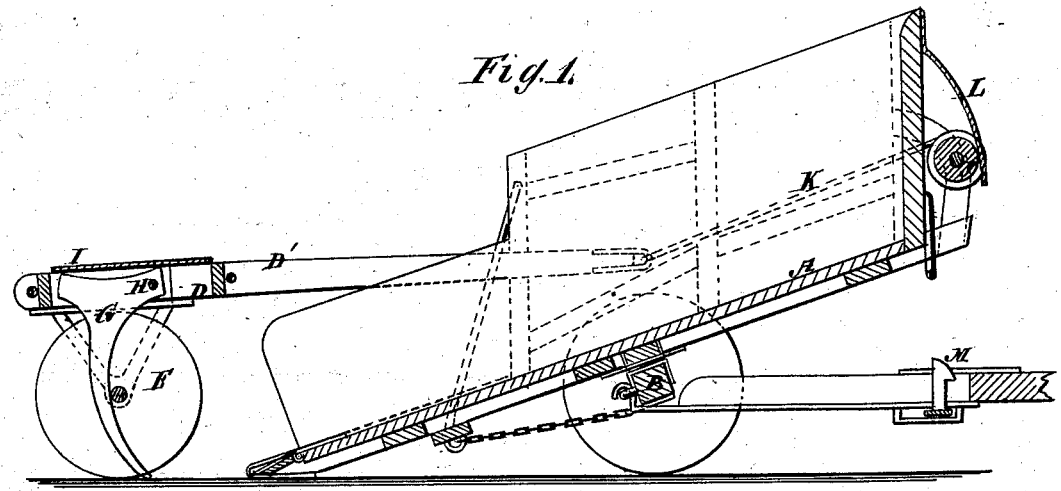
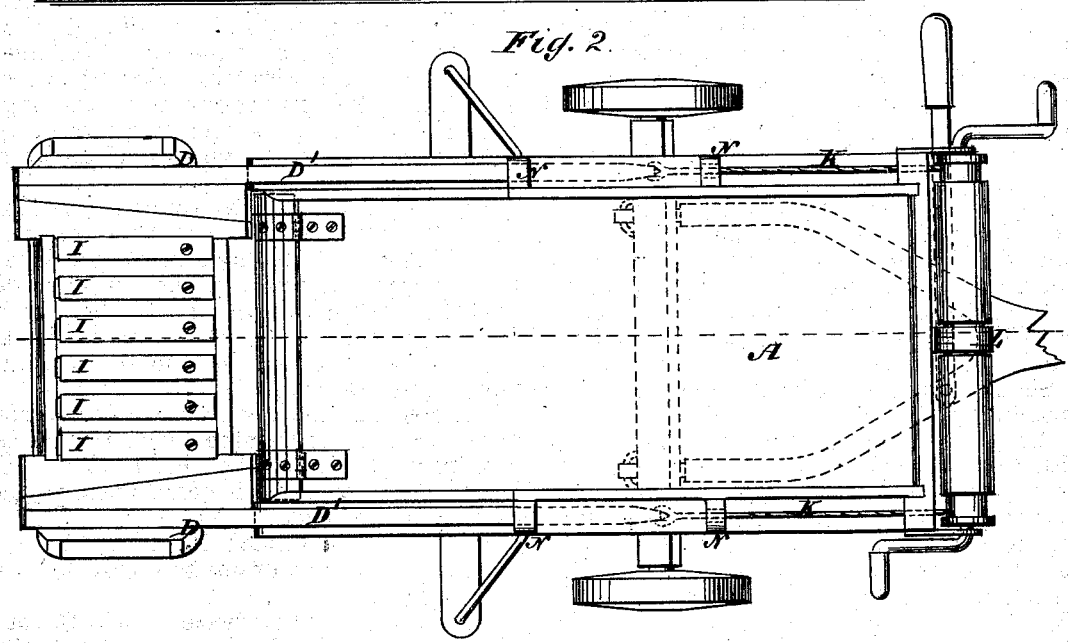
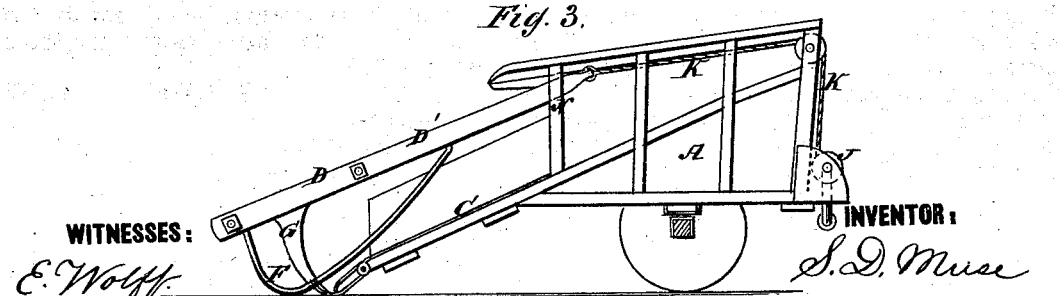
WITNESSES:
E. Wolff
Alex F. Roberts
INVENTOR:
S. D. Muse
BY
ATTORNEYS.

UNITED STATES PATENT OFFICE.

SAMUEL D. MUSE, OF MONTICELLO, MISSISSIPPI.

IMPROVEMENT IN RAKERS AND LOADERS.

Specification forming part of Letters Patent No. 155,664, dated October 6, 1874; application filed June 20, 1874.

*To all whom it may concern:*

Be it known that I, SAMUEL D. MUSE, of Monticello, in the county of Lawrence and State of Mississippi, have invented a new and Improved Combined Raker and Loader, of which the following is a specification:

The invention will first be fully described, and then pointed out in the claim.

Figure 1 is a longitudinal sectional elevation of a truck, with a rake and windlass arranged as I propose for gathering pine-straw and for other like purposes. Fig. 2 is a plan view of Fig. 1. Fig. 3 is a side elevation of a modified form of truck and rake adapted for hand or animal power.

Similar letters of reference indicate corresponding parts.

A represents the box of a truck, which may either be mounted on an axle, B, so as to tilt down to the ground at the rear end, as at Fig. 1, or it may have a sloping portion, C, extending from the rear end to the ground. D is a rake-truck, which may either be mounted on wheels E, as in Fig. 1, or on runner F, as in Fig. 3. G represents rake-teeth, attached to the rake-truck, for gathering the pine-straw. They are pivoted to it at H, and held to the work by an independent spring, I, to allow them to swing back and upward in case of catching roots and other obstructions, to pass over them. J is a windlass with a crank-shaft for drawing up the pine-straw into the boxes by ropes K. When the box is arranged to tilt down, as in Fig. 1, it will have a spring-catch, M, on the tongue for holding it, when adjusted for carrying off the load. The rake-truck is provided with two beams, D', which extend along the box, one on each side, through guides N, to control it when it is drawn up, and also when it is running behind to gather the straw.

For light machines the arrangement of the box with a sloping extension, C, and the runners F in place of the wheels, may be preferred, but for heavy machines, it may be more desirable to adopt the arrangement shown in Fig. 1. L is a friction spring-brake to the windlass, to hold the truck in the box and regulate its descent.

The object is to provide a simple and efficient means for gathering pine-straw to be used as a fertilizer. The machine may also be used for gathering other substances or material in like manner.

Having thus described my invention, what I claim as new, and desire to secure by Letters Patent, is—

The rake G H on a wheeled truck, D, combined with a vehicle having a rearwardly-tilting body, K, the former being movable within the body of the latter, as and for the purpose specified.

SAMUEL D. MUSE.

Witnesses:
M. F. BLOCK,
C. C. EIVERS.